Aug. 12, 1969  R. DUMANCHIN  3,461,402
LASER DEFLECTOR HAVING A NON-UNIFORM FIELD APPLIED
TO AN ELECTRO-OPTIC CRYSTAL
Filed May 14, 1964  2 Sheets-Sheet 1

INVENTOR
ROGER DUMANCHIN
BY Paul M. Craig, Jr
ATTORNEY

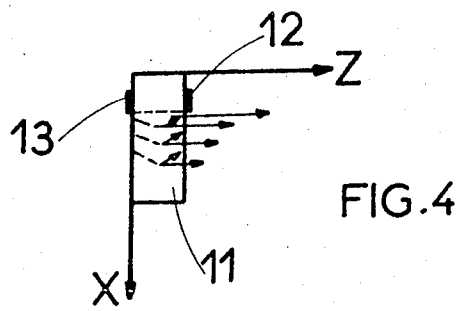
FIG. 4
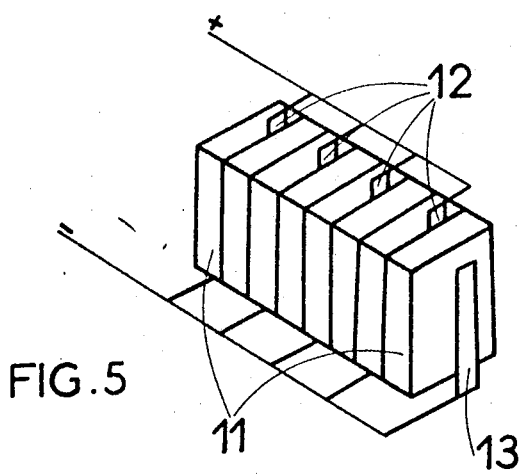
FIG. 5
FIG. 6
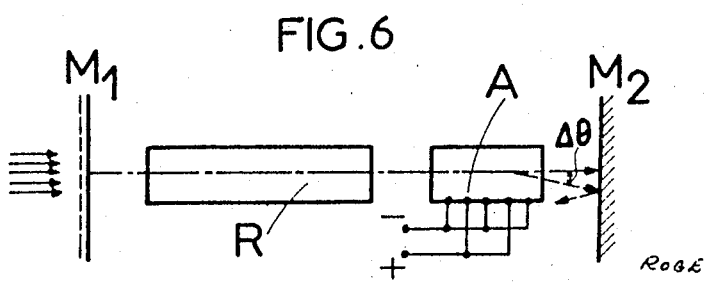

United States Patent Office 3,461,402
Patented Aug. 12, 1969

3,461,402
LASER DEFLECTOR HAVING A NON-UNIFORM FIELD APPLIED TO AN ELECTRO-OPTIC CRYSTAL
Roger Dumanchin, Montgeron, France, assignor to Compagnie Generale d'Electricite, Paris, France
Filed May 14, 1964, Ser. No. 367,458
Claims priority, application France, May 17, 1963, 935,252
Int. Cl. H01s *3/00;* G02f *1/28, 1/36*
U.S. Cl. 331—94.5      2 Claims

ABSTRACT OF THE DISCLOSURE

A device for the control of laser oscillation including a crystal in a resonant optical cavity of the Fabry and Perrot type, said crystal being capable of effecting selective deviation of a beam of light from its direction under the effect of an electric field gradient in the crystal produced by a voltage selectively applied thereto.

---

The present invention has the purpose of improving Laser oscillator devices, in particular with regard to oscillation control.

Control of the laser oscillator makes it possible to obtain monochromatic and coherent light impulses of very short duration the peak power of which can attain values of the order of 50 mw.

The coherence and great peak power of the laser transmission afford multiple applications in all fields where very high power impulses are required, particularly in the field of optical radar and telemetering. The very highly directional properties of the beam can enable focussing on to a surface of the order of a micron, a very important property which can be used with advantage in chemistry and surgery.

The laser oscillation is obtained, in the case of solid lasers, by placing the crystal in an echoing cavity, generally of the Fabry and Perrot type. These echoing optical cavities consist of two plane mirrors one of which must have a reflection factor of 100%, the other having a transmission factor of a few percent thus making it possible to receive the transmission from the crystal; this transmission, generally having particularly good directional properties, is received along an axis perpendicular to the said mirrors. The laser oscillation can only appear if the cavity in which the crystal is placed has been sufficiently energized.

In order to obtain a laser transmission in the form of short-duration impulses, in particular with a view to the above-mentioned applications, the laser oscillator is controlled by suitable modulation of energization of the echoing cavity.

Attenuation is introduced in the light wave in the cavity; sharp cutting of this attenuation makes it possible to achieve energization conditions, with the liberation of accumulated power, which manifests itself in a short beam of monochromatic and coherent light.

Echoing cavities of the Fabry and Perrot type require very fine adjustment of the parallelism of the mirrors. For normal pumping wave powers, a fault in parallelism, represented by a mirror angle of about twenty minutes, that is to say $\frac{1}{100}$ in radians, no longer makes it possible to obtain oscillation conditions since energization is attenuated by power losses in the side surfaces of the cavity. This is the same if, with the mirrors properly parallel, the light beam is deviated from this angle within the cavity.

According to the invention, the device makes it possible to put this property of cavities to use so as to modulate the energy in the cavity and thus obtain modulations of this energy with very high peak power.

Laser assemblies have been proposed the control of which is based on the said property of echoing cavities:

(1) With the laser emitting polarized light, a variable system of polarizers and dephasing cells enables control of the rotation of the polarization plane of the light beam which can then be deviated by a sufficient angle for oscillating conditions to be no longer fufilled.

(2) According to the invention, the device makes it possible to deviate the beam inside the cavity without the introduction of components requiring adjustment when functioning, the deviation of the beam being electrically controlled, without the use of mechanical transmission devices.

The invention has for its purpose a control process and device for crystal laser oscillators consisting of an echoing optical cavity the energization of which is a function of the angle of incidence of the light beam on the mirrors in the cavity.

According to the invention, the process is characterized by the fact that the angle of incidence of the said beam on the mirror is controlled by an optical cell with a variable index of refraction, behaving normally in the same manner as a blade with parallel surfaces, but deviating the direction of the beam under the effect of birefringence provoked by an electric field gradient in the crystal.

The invention also has for its purpose a device for the putting into operation of the aforementioned process which is characterized by the fact that the said cell consists of at least one blade with parallel faces cut perpendicularly to the optical axis.

According to the invention, the electric field gradient is engendered in each blade by two electrodes each placed on a face of the blade and raised to different potentials.

Other features of the invention will appear in the course of the description which follows, which has been effected for explanatory and in no way limitative reasons, by referring to the attached drawings on which:

FIGURE 4 shows the distribution of the electric field in the blade.

FIGURE 5 represents an optical cell according to the invention.

FIGURE 6 is a diagram of a laser oscillator equipped with a device in keeping with the invention.

There exist single axis crystals which have the property of becoming dual axes when they are placed in an electric field which is parallel to the optical axis. The new axes, corresponding to indexes $n_0 + \Delta n$ and $n_0 - \Delta n$, are at 45° to the axis of symmetry of the crystal. The index variation $\Delta n$ is a function of the electric field applied and of the direction of this field.

The above mentioned principle, for example, is applicable to mono-ammonic phosphate (ADP) $PO_4H_2NH_4$ and mono-potassic phosphate (KDP) $PO_4H_2K$ crystals. In the case of the latter, the substitution of deuterium for hydrogen atoms gives deuterium loaded mono-potassic phosphate which is of much greater efficiency. These crystals are preferred for making the device which will be described hereafter.

Figure 1:
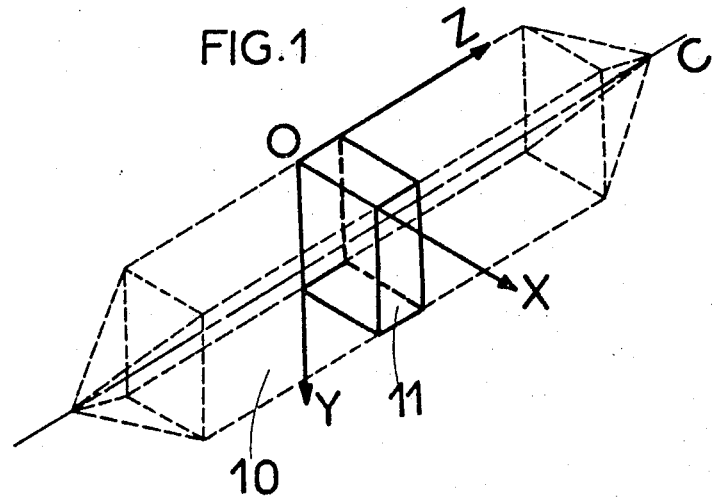
FIGURE 1 is a view of a crystal.

At reference 10, on FIGURE 1, such a crystal, shown in dotted line, may be seen. A blade 11 is cut perpendicularly to the optical axis C of crystal 10. In the absence of an electric field, the blade behaves like a blade with parallel surfaces for a beam parallel to axis C. OX, OY and OZ are three perpendicular reference axes for blade 11, OZ being parallel to axis C.

Figure 2:
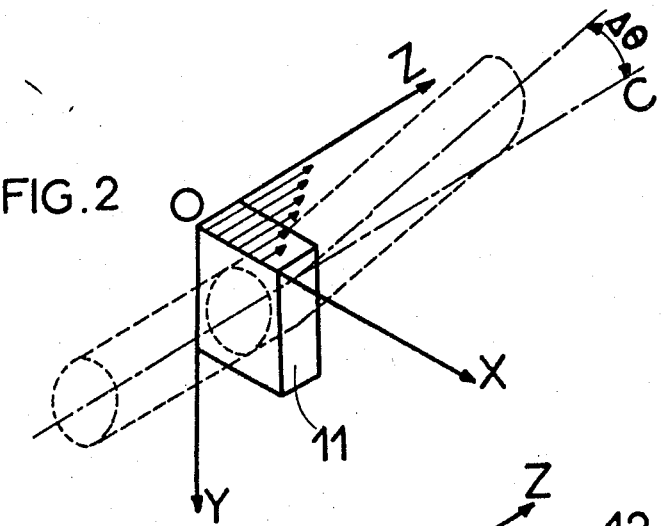
FIGURE 2 is a view of a blade cut in this crystal.

In the case of FIGURE 2, blade 11 is subjected to a nonhomogeneous electric field parallel to axis C. This electric field is constant along a line parallel to OY and decreases along a line parallel to OX from a value $Em$ for $X=0$ to a value of zero for $X=a$, $a$ being the width of blade 11. The index varies according to a parallel line at OX, passing for example from $n_0 + \Delta n$, for $X=0$ to $n_0$ which is the usual index of the crystal, for $X=a$, variation $\Delta n$ being a function of the crystal and the value of the electrical field. This results in a difference in functioning between two abscissa bridges $X=0$ and $X=a$, which is equal to $f=e\Delta n$, $e$ being the thickness of the blade, dephasing $$\Delta q = \frac{2ne\Delta n}{\lambda}$$

corresponds to this difference of functioning $f$.

The beam is deviated by an angle $\Delta \theta$ which has a value of $$\Delta \theta = \frac{e\Delta n}{a}$$

If the beam is polarized diagonally across the blade, derivation is effected in one single direction.

If, on the contrary, the beam is not polarized or polarized in any direction, the beam is divided into two symmetrically deviated parts.

In any case, all the light energy is deviated in a manner sufficient to avoid oscillation.

Figure 3:
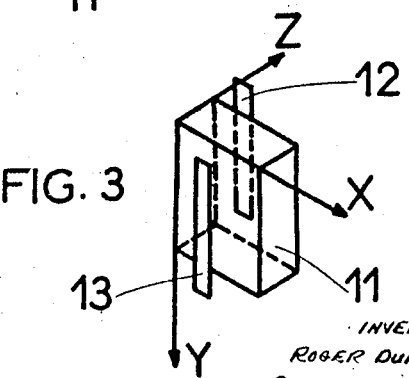
FIGURE 3 is a view of this blade equipped with electrodes.

FIGURE 3 represents the practical form of a variable index blade. It is equipped, on its two surfaces, with electrodes 12 and 13 between which there is a difference of potential. Electrodes 12 and 13 may be obtained by depositing metal under vacuum.

FIGURE 4 represents the blade of FIGURE 3 seen from above and illustrates the distribution of the electric field. The dotted lines show the lines of force of the electric field. The arrows indicate the different values of this field. At a certain distance from the electrodes, the field is practically zero.

The maximum relative variation of index $\Delta n/n_0$ obtained up to now is $10^{-3}$. This has been achieved with non-deuterium loaded monopotassic phosphate subjected to a 20 kv./mn. field, which is clearly lower than the dielectric rigidity of this crystal. The usual index is $n_0 = 1.4684$. The minimum angle $\Delta \theta$ to be obtained being $1/170$ of a radian, the minimum width for a beam of a width of $a=2$ mm. is $$e = a\frac{\Delta \theta}{\Delta n}$$

or about 8 mm. which leads to a voltage of 160 kv.

Since this voltage is prohibitive, the invention proposes to arrange several blades in series. Thus, in the example mentioned hereabove, eight blades 1 mm. thick can be arranged in series. Such an arrangement is represented in FIGURE 5. The eight blades 11 are adjacent to one another. Successive electrodes are alternately raised to positive and negative potentials; by reason of this fact, the direction of fields is inverted when passage takes place from one crystal to a neighbouring crystal. For deviations to be effected in the same direction and to be cumulative every other blades has been turned through 90°. Blades are secured together with an optical balsam or glue, the index of which shall be as close as possible to the usual index $n_0$ of the crystal. The blade assembly 11 forms an optical cell A.

FIGURE 6 represents a schematic section of the laser control in keeping with the invention. The crystal R, the radiation of which is to be stimulated, is placed in an echoing optical cavity, for example between the mirrors of an echoing cavity of Fabry and Perrot type consisting of two plane mirrors $M_1$ and $M_2$. Mirror $M_2$ is totally reflecting. Mirror $M_1$ has very reduced transmission capability, of a few percent, and enables reception of the coherent transmission from the laser oscillator in the axis of symmetry of crystal R.

Between mirror $M_2$ and crystal R is interposed a variable incidence optical cell A, the surfaces of this cell being strictly parallel to the faces of crystal R and to the faces of mirrors $M_1$ and $M_2$.

Functioning of the laser transmission control device is as follows:

With the echoing cavity supplied with light energy by conventional means, the variable incidence optical cell A, not being subjected to the electric field, behaves like a simple blade with parallel surfaces without dephasing and introduces no deviation in the direction of propagation of the light beam between the two mirrors. If the amount of power accumulated in the cavity is sufficient to produce energization, with light rays nearly perpendicular to the mirrors, laser oscillation can take place.

When voltage V is applied to the electrodes of the variable index cell, the electric field gradient engenders a gradient of the same index as that of the control cell crystal, the beam is deviated by an angle of $\Delta \theta$, incidence conditions of light rays on the mirrors are no longer fulfilled and the laser oscillation cannot take place.

Control of the transmission is thus conducted through application of voltage V during "charge," the instantaneous return of voltage V to value 0, at the moment when the stored energy is at a maximum, trips the discharge.

The advantages afforded by the system of the lasser oscillation, in keeping with the invention, are the following:

Reduced bulk; the control device is housed in the echoing cavity.

No mechanical adjustment in course of operation by reason of the electrical control.

No other condition on the value of the control voltage than it be above a certain minimum; control is all the better when this voltage is higher. In conventional control devices, such as those used for extinguishing the light beam with a system of polarizers, the rotation of the polarization plane, when this is electrically controlled, requires the application of a well-defined voltage.

It is understood that the application of the control device to crystal lasers has only been described herein for explanatory purposes, it being possible to adapt the system to gas laser oscillator devices without departing from the teachings of the present invention.

Similarly, crystals of variable index are recommended by the applicant as in no way limitative examples, all single axis crystals with a sufficiently variable index, as a function of an electric field, may be used in the assembly without however departing from the spirit and scope of the invention as defined in the appended claims.

What I claim is:

1. In a laser comprising an active element placed inside a cavity of the Fabry-Perrot type formed of two parallel opposed mirrors, the improvement comprising a cell including at least one parallelepipedic crystal placed in the cavity on the path of the laser light and providing a non-uniform refraction index in response to application of a non-uniform electric field thereacross and means for applying said non-uniform electric field comprising two plane electrodes placed on a portion of the surface of the two opposite faces of said crystal transverse to the optical axis thereof and a voltage source selectively connected to said electrodes to create in the crystal said non-uniform electric field having substantially parallel lines of force.

2. A laser as defined in claim 1 wherein said cell comprises a plurality of adjacent crystals.

References Cited

UNITED STATES PATENTS

| | | | |
|---|---|---|---|
| 3,167,607 | 1/1965 | Mark et al. | 350—150 |
| 3,297,876 | 1/1967 | De Maria | 331—94.5 |
| 3,339,151 | 8/1967 | Smith | 331—94.5 |

OTHER REFERENCES

McClung and Hellwarth, Giant Optical Pulsations From Ruby, September 1961, pp. 1–6, Research Laboratories.

RONALD L. WIBERT, Primary Examiner

E. BAUER, Assistant Examiner

U.S. Cl. X.R.

350—160